July 19, 1966   C. C. ROUTH   3,261,969
DISPERSIVE DELAY LINE
Filed March 7, 1962   3 Sheets-Sheet 1

INVENTOR.
CLAUDE C. ROUTH
BY
ATTORNEYS

PHASE RESPONSE OF ONE SECTION OF THE DELAY LINE FOR VARIOUS DESIGN $\alpha f_0$ VALUES PHASE SHIFT VS FREQUENCY RESPONSE OF FILTERS A and A' PLUS THEIR SUM

INVENTOR.
CLAUDE C. ROUTH
BY
ATTORNEYS

July 19, 1966  C. C. ROUTH  3,261,969
DISPERSIVE DELAY LINE
Filed March 7, 1962  3 Sheets-Sheet 3
FIG. 4
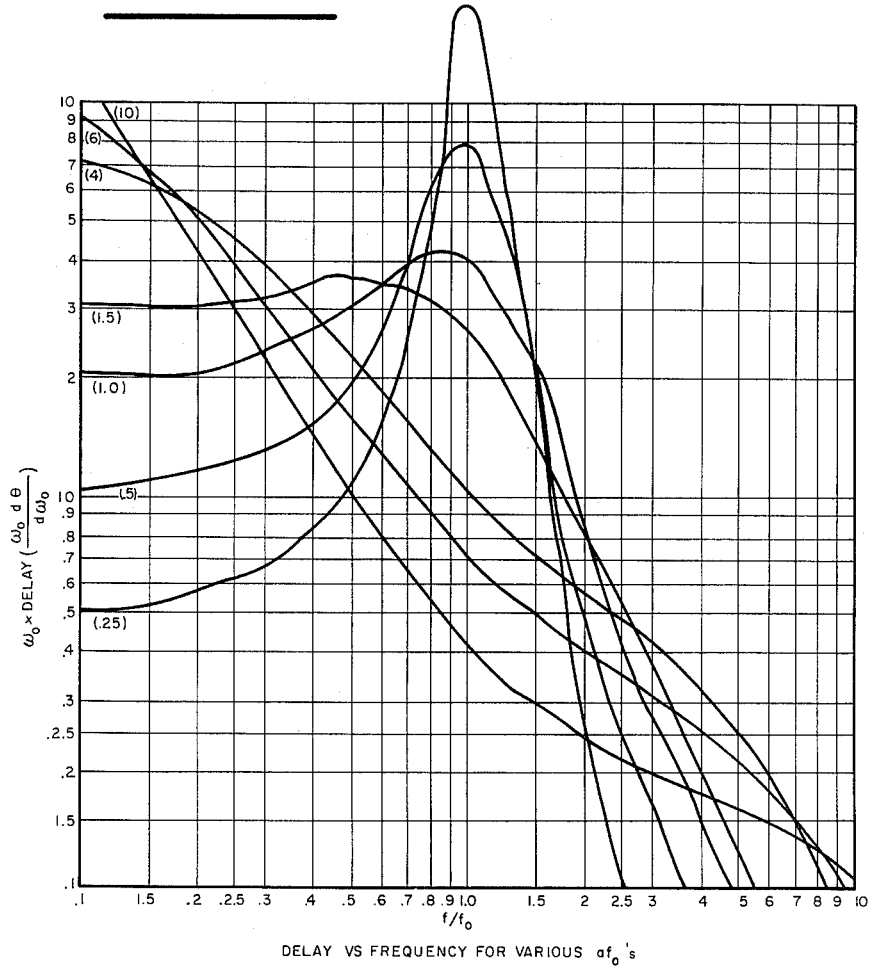
DELAY VS FREQUENCY FOR VARIOUS $af_o$'s
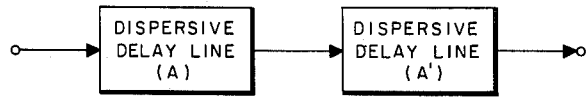
FIG. 5
INVENTOR.
CLAUDE C. ROUTH
BY
ATTORNEYS മ
United States Patent Office 3,261,969
Patented July 19, 1966

3,261,969
DISPERSIVE DELAY LINE
Claude C. Routh, 3345 29th St., San Diego 4, Calif.
Filed Mar. 7, 1962, Ser. No. 178,528
6 Claims. (Cl. 235—181)

The invention described herein may be manufactured and used by or for the Government of the United States of America for governmental purposes without the payment of any royalties thereon or therefor.

The present invention relates generally to delay lines and in particular is an electronic dispersive delay line with delay characteristics that vary smoothly in inverse proportion with the frequency applied thereto.

In the past, delay lines having fixed delay characteristics, regardless of the frequency applied thereto within their operational band, have been employed with some degree of success in somewhat limited instances; however, for many practical purposes they are not well suited for the operation desired to be performed. For instance, a fixed delay type of line can only be satisfactorily used over a limited bandwidth, which, of course, limits the applications thereof. Moreover, the signal-to-noise ratios obtained therefrom under such circumstances usually leave a great deal to be desired.

The present invention overcomes these difficulties to a considerable extent in that improved signal-to-noise ratios are obtained through the appropriate broadband signal processing permitted by the technique of dispersively delaying the noise and coherent signal in inverse proportion to the frequency thereof.

It is, therefore, an object of this invention to provide a delay line having optimum dispersion.

Another object of this invention is to provide an improved method and means of delaying an electrical signal in accordance with a predetermined inverse function of the frequency thereof.

Still another object of this invention is to provide an improved delay line having wide frequency band operation.

A further object of this invention is to provide an improved wideband sonar autocorrelation system.

A further object of this invention is to provide an improved cross-correlation system having optimum signal-to-noise ratios.

Still another object of this invention is to provide an improved method and means for optimizing the processing of sonar signals through use of relatively large delay techniques.

A further object of this invention is to provide improved methods and means for increasing the sensitivity of sonar receivers.

A further objective of this invention is to provide methods and means which permit the use of narrow filters at sonar system outputs, thereby resulting in passage of less coherent noise.

Still further objectives of this invention is to provide an improved delay method and means having a period that is equal to a constant number of cycles delay.

Another object of this invention is to provide an improved delay line which has reduced physical size characteristics for any given delay as compared to those of a fixed delay line.

Another object of this invention is to provide an improved delay line method and means which have insertion losses that are sufficiently low to be practically negligible.

Another object of this invention is to provide a method and means of constructing a delay line having delay characteristics which are inversely proportional to the frequency of the signal being processed thereby which is easily and economically manufactured and maintained.

Other objects and many of the attendant advantages of this invention will be readily appreciated as the same becomes better understood by reference to the following detailed description when considered in conjunction with the accompanying drawings wherein:

FIG. 4 is a graphical representation of a family of curves of delay versus frequency responses respectively corresponding to some of the phase shift-frequency response curves of FIG. 3;

FIG. 5 is a block diagram of a pair of series connected delay lines each of which are of the type constituting this invention and each of which contain similar subcomponents having different design values;

Figure 7:
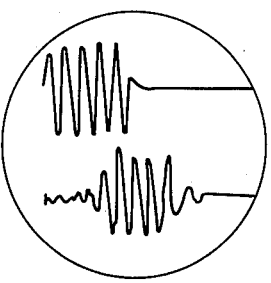
Figure 6:
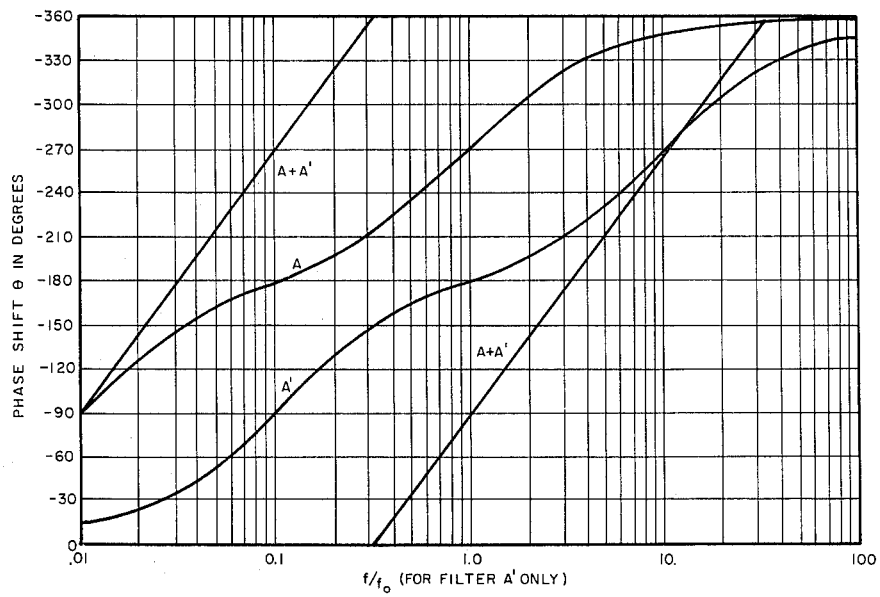

FIG. 6 graphically illustrates the phase shift versus frequency response curves of the series connected delay lines of FIG. 5 and the sum response of a typical section of one design with that of a typical section of the other design; and FIG. 7 depicts a pair of oscilloscope views of the respective input and output signals of the subject delay line when two different input frequencies are being processed therein, thereby indicating that the amount of delay obtained is an inverse function of the frequency of the input signal.

Figure 1:
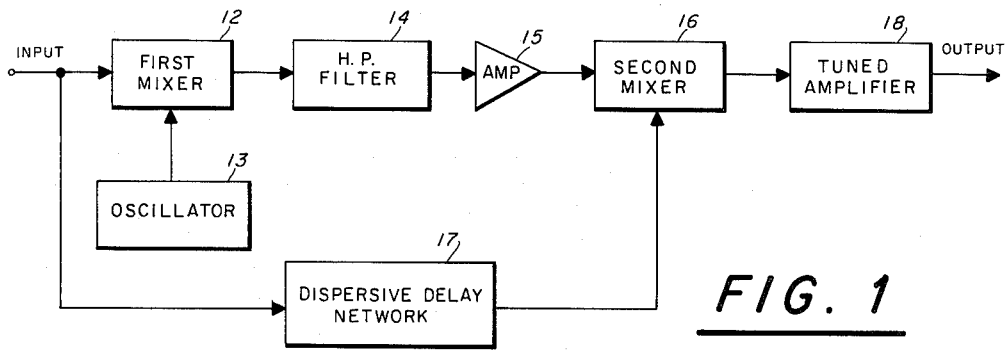
FIG. 1 illustrates in block diagram form an autocorrelation system employing the dispersive type delay network constituting the subject invention.

Referring now to FIG. 1 there is shown an exemplary autocorrelation system of the type which may be used in sophisticated sonar or radar systems or any other appropriate echo ranging systems, and which is shown to include in combination therewith the dispersive delay line network of this invention. As can be seen, said autocorrelation system includes a first mixer 12 having a pair of inputs and an output. One of the inputs thereof is supplied by an oscillator 13 operating at $f_0$ frequency. The output of mixer 12 is applied to a highpass filter 14, the output of which is amplified in an amplifier 15 and fed to one of a pair of inputs of a second mixer 16. A dispersive delay line network 17 receives its input from the other input of the aforesaid mixer 12 (which, of course, is the noise plus coherent input signal to the autocorrelation system) and its output is applied to the other input of the aforesaid second mixer 16. The output of mixer 16 is then applied to the input of a tuned amplifier 18.

In wideband sonar monitoring receivers using autocorrelation systems of the type described in connection with FIG. 1 above, the correlation time or delay time should be limited to a period of about one-half of the shortest ping length that the receiver is expected to intercept. This is because the ping length at the output of the autocorrelator is equal to the input ping length minus the relative delay. This reduction in ping length requires an increase in bandwidth of the final filter for the correlated signal, with a resultant increase in the noise passed. In practical sonar, the shortest useful ping may contain about ten cycles of the signal frequency, and the minimum anticipated ping length will be inversely proportional to the sonar operating frequency. A relatively large delay is preferable in order that the fewest possible number of noise components will make a direct contribution at the filtered output correlation frequency. Also, a narrowband output filter is preferable in order to exclude as much dispersed or incoherent noise as possible. If a fixed delay is employed, the duration of the amount of delay that can be used is limited by the shortest anticipated ping length. Of course, the shortest anticipated ping length is determined by the highest frequency the monitoring receiver is designed to intercept. This problem is further complicated during underwater echo-ranging operations by the fact that both the receiving ship's self-noise and the ambient noise in the sea tend toward a −5 db per octave spectrum slope. This preponderance of low frequency noise along with the relatively high coherence thereof severely limits the receiving sensitivity of very wideband fixed delay autocorrelation receivers.

The performance of any wideband autocorrelation intercept receiver can be improved by passing the correlated output signal progressively through narrower and narrower filters. This can provide multiple correlated outputs with filter widths appropriate for the various anticipated input ping lengths. Nevertheless, with a relatively short fixed delay and low frequency noise in the input, coherent noise components will occur and will pass through narrow output filter. But using a delay line whose delay is inversely proportional to the frequency; that is, one having a period equal to a constant number of cycles delay, can automatically provide the highest effective delay that is consistent with ping requirements, thereby increasing the efficiency of the autocorrelation system. Furthermore, it will provide the longest delay at the low frequencies where the noise problem is most acute. Combining the advantages of a frequency sensitive delay with progressive output filtering and multiple outputs in an autocorrelation system such as that disclosed in FIG. 1 will produce considerable improvement in the correlation type monitoring occurring therein and, thus, improve performance of the receiver having such autocorrelation system incorporated therein.

Figure 2:
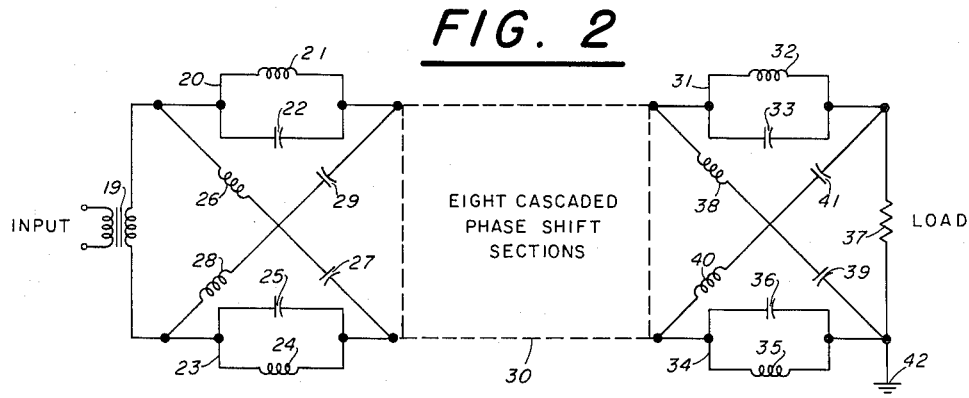
FIG. 2 is a schematic representation of a preferred embodiment of this invention.

Referring now to FIG. 2, the dispersive delay network of this invention is shown as an all-pass-phase-equalizer type of lattice network of components for producing a delay that is inversely proportional to the frequency of the signal being processed thereby. In said figure, ten sections are indicated; however, only the first and last sections are disclosed in detail. It should be understood that the intermediate sections interposed between said first and last sections are substantially identical thereto even though only represented by a block.

FIG. 2 shows the input of said dispersive delay line to be a transformer 19 of any preferred type which will perform the impedance matching operation between the output of associated circuitry and provide a pair of signals having a 180° phase difference as the input of the delay line. The secondary winding of transformer 19 should be so designed as to have an active impedance Z which is equal to the resistance R of the load to be further disclosed subsequently. It contains two output terminals one of which is connected to a tank circuit 20 containing an eighty-eight millihenry inductor 21 and a five hundred ten micromicrofarad capacitor 22 connected in parallel therewith. The other output terminal of said transformer secondary winding is connected to another tank circuit 23 containing an eighty-eight millihenry inductor 24 and a five hundred ten micromicrofarad capacitor 25 connected in parallel therewith. The output of tank circuit 20 and the output of tank circuit 23 constitutes the output of the first section of the subject dispersive delay line. Interconnecting the input of tank circuit 20 and the output of tank circuit 23 is a filter network consisting of a five and five-tenths millihenry inductor 26 and an eighty-two hundred micromicrofarad capacitor 27 coupled in series therewith. Likewise, coupled between the input of tank circuit 23 and the output of tank circuit 20 is a filter network consisting of a series connected five and five-tenths millihenry inductor 28 and eighty-two hundred micromicrofarad capacitor 29. The output of said first section is connected through eight similar sections represented by dotted block 30, the output of which is applied to the last section of the instant delay line. Said last section is shown as including a tank circuit 31 containing an eighty-eight millihenry inductor 32 and a five hundred ten micromicrofarad capacitor 33 coupled in parallel therewith. Connected to the other input of said last section is another tank circuit 34 having an eighty-eight millihenry inductor 35 and a five hundred ten micromicrofarad capacitor 36 connected in parallel therewith. A thirty-four hundred ohm load resistor 37, representing associated load circuitry, is connected to the output of the aforesaid tank circuits 31 and 34, which, of course, also constitute the output of said last section of the subject delay line. Interconnecting the input of tank circuit 31 and the output of tank circuit 34 is a series connected filter network containing a five and five-tenths millihenry inductor 38 and eighty-two hundred micromicrofarad capacitor 39. Likewise, interconnecting the input of tank circuit 34 and the output of tank circuit 31 is a series connected filter network containing a five and five-tenths millihenry inductor 40 and an eighty-two hundred micromicrofarad capacitor 41. If so desired, one of the output terminals may be grounded by a ground 42 for reference potential purposes.

It should be understood that all of the aforementioned components are conventional and well-known in the electronic art, and that it is their arrangement and respective design values that produce the unique method and means of delaying an electrical signal an amount inversely proportional to the frequency of the intelligence or coherent signal passing therethrough. Furthermore, although the aforementioned specific values have been assigned to said components respectively, it is deemed within the spirit and scope of this invention to change or vary the same in accordance with the design choice delay-frequency functional characteristics wanted, because so doing would obviously be within the purview of one skilled in the art after he had the benefit of the teachings herein presented.

In addition, it should be understood that although only ten dispersive delay line sections are illustrated in FIG. 2, as many sections as desired may be incorporated in any particular delay line to effect the amount and type of delay characteristics wanted, as well as other functional characteristics which may be deemed necessary or desirable under any given operational circumstances.

Briefly, the theory of operation of the invention is as follows:

It has been mathematically determined that the phase shift of the subject delay line must vary logarithmically with the frequency characteristics in order to have the desired slope in the delay. It was found that using the proper values of inductance and capacitance components effected this result in each section of the delay line, and it can be shown that the phase shift for a cascaded plurality of these sections is the sum of the individual sections. Because it is desirable in some instances for the output level to vary linearly with the input level, the proper slope to achieve this result may be obtained by appropriately combining a number of sections in the cascade arrangement mentioned above.

A lattice network as shown in FIG. 2 has a passband whenever the impedance $Z_a$ across the LC tank circuit and the impedance $Z_b$ across the diagonal LC circuit have opposite signs, as in parallel versus series LC circuits which are tuned to the same frequency. In this instance, for example, $Z_a$ would be considered as being the impedance of a shunt arm comparable to said parallel LC circuit and $Z_b$ would be considered as being the impedance of a cross arm comparable to the aforesaid series LC circuit. In this case, the attenuation constant is then zero, the image impedance is a resistance, and the phase shift $\theta$ may be obtained from the equation $$\tan \frac{\theta}{2} = -j\sqrt{\frac{Z_a}{Z_b}} \qquad (1)$$

Furthermore, if $Z_a$ and $Z_b$ are made reciprocal impedances relative to load R, that is, $$Z_a Z_b = R^2 \qquad (2)$$

then the input and output impedance is the load resistance R for all frequencies, and the passband includes all frequencies. Also, if Equation 2 is substituted in Equation 1, the equation $$\tan \frac{\theta}{2} = -j \frac{R}{Z_b} = -j \frac{Z_a}{R} \qquad (3)$$

which represents the equation from which the aforesaid slope may be derived, since $j$ is an imaginary number.

The value of $Z_a$ (or $Z_b$) for a chosen load R that gives a logarithmic or other suitable phase $\theta$ versus frequency characteristics is best visualized by introducing a design parameter $af_o$ where $a$ is some constant divided by $f_o$ and $f_o$ is the frequency where $\theta = -180°$. The curves of any of an infinite number of phase vs. $f/f_o$ characteristic can be depicted graphically as representatively shown in FIG. 3 for design convenience.

Since:

$$\tan \frac{\theta}{2} = -\infty \text{ for } \theta = -180°$$

it can be seen from Equation 3 that $Z_b = 0$ and $Z_a = \infty$ at $f_o$, load resistance R being a fixed constant and finite.

Having established these relationships, it can be shown that the values for the L and C components involved may be calculated as follows if it is assumed that:

Inductors 21 and 24 each have an inductance $L_1$,
Capacitors 22 and 25 each have a capacitance $C_1$,
Inductors 26 and 28 each have an inductance $L_2$,
Capacitors 27 and 29 each have a capacitance $C_2$,
Load 37 has a resistance R, and
The secondary winding of transformer 19 has an impedance $Z$ = load resistance R. Then, $$L_1 = \frac{aR}{2\pi} \qquad (4)$$

$$C_1 = \frac{1}{f_o^2 \pi aR} \qquad (5)$$

$$L_2 = R^2 C_1 = \frac{R}{2\pi af_o^2} = \frac{L_1}{(af_o)^2} \qquad (6)$$

$$C_2 = \frac{L_1}{R^2} = \frac{a}{2\pi R} = C_1 (af_o)^2 \qquad (7)$$

$$R = \frac{\sqrt{L_1}}{\sqrt{C_2}} \qquad (8)$$

Figure 3:
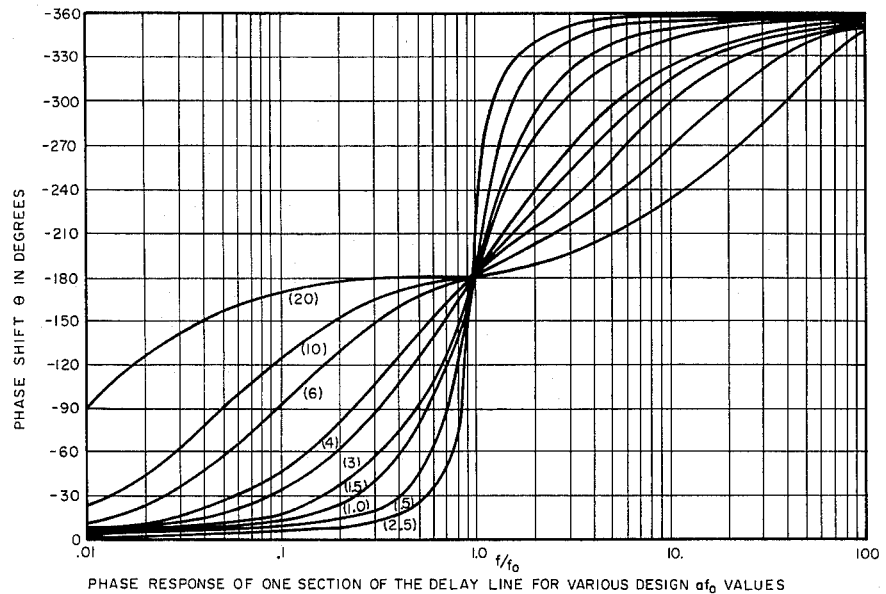
FIG. 3 is a graphical representation of a family of curves showing phase shift versus frequency-response of an all-pass filter having various design "center" frequencies, $f_0$.

When the inductance and capacitance circuit elements are expressed in these terms, $$\tan \frac{\theta}{2} = \frac{-af_o(f/f_o)}{1-(f/f_o)^2} \qquad (9)$$

and FIG. 3 is a graphical representation of a family of $af_o$ curves plotted from the $\theta$ and $f/f_o$ terms of Equation 9. In view of the fact that delay is the derivative of the phase shift with respect to frequency, the family of curves of FIG. 3 determine a corresponding family of delay vs. $f/f_o$ curves that, in part, are represented by FIG. 4 and, accordingly, it can be seen that delay in this case becomes some inverse function of the frequency of the signal being processed by the subject dispersive delay network.

When two of the subject dispersive delay lines having different delay versus frequency characteristics designed therein are connected in series as is shown in FIG. 5, their phase responses are additive. Curves A and A' of FIG. 6 are representative of exemplary individual delay line phase response curves for a design $af_o$ value of 10 in each case, and when they are added together, they provide substantially the curve reference as $A+A'$. In this particular example, however, said curve $A+A'$ is a straight line representing approximately 90° to 720° phase shifts from .01 to approximately 33 values of $f/f_o$.

It has been ascertained mathematically that for a dispersive delay line to have delay characteristics truly inversely proportional to frequency, that is for $d\theta/dw$ to equal $k/w$ (where $w = 2\pi f$, $f$ is the frequency of the coherent signal being processed, and $k$ is a constant), requires that $$\frac{d\theta}{d(\log w)}$$

be constant or that the slope of $\theta$, as a function of the logarithm of frequency, is constant or a straight line. This is true because:

$$k = \frac{wd\theta}{dw} = \frac{d\theta}{(1/w)dw} = \frac{d\theta}{d(\log w)} \qquad (10)$$

since $$d(\log w) = \frac{1}{w} dw \qquad (11)$$

Then a phase shift $\theta$ versus $f/f_o$ curve would be a straight line if plotted on semi-log paper with $f/f_o$ being graphed logarithmically as shown in FIG. 6.

Although in this particular example only two series cascaded dispersive delay lines were employed for disclosure purposes to illustrate how a true inverse function may be obtained when such is desired for other operational reasons, any number of series connected dispersive delay lines of the type constituting this invention may be used to satisfy the functional requirements of other operational arrangements without violating the spirit and scope of this invention, inasmuch as so doing would be obvious to the skilled artisan from the teachings herein presented.

In actual operation, the subject invention performs in a very simple manner. The intelligence or input signal is applied thereto from any pertinent apparatus (such as the autocorrelation system shown in FIG. 1), whereupon the phase thereof is shifted in accordance with the theoretical principles discussed above. This phase shift, in effect, produces an output intelligence or signal that is similar to the original input signal but smoothly delayed in time with respect to the initial application thereof to the subject dispersive delay line network in accordance with an inverse function of the frequency thereof. The component value designs and unique structural arrangement thereof, of course, effects the inherent delay-frequency relationships which result in the invention's usefulness in providing a new and novel method and means for optimizing numerous electronic systems where such relationships constitute an improvement over fixed delay characteristics.

If oscilloscope patterns are obtained of said time correlated input and output signals to and from the subject dispersive delay line network during the processing thereof thereby, it can be visually seen that the aforementioned unique delay or phase shift actually does take place as a function of the frequency and that the delay is increased as the frequency is decreased or vice versa. Although the disclosure of the preferred embodiment of this invention exemplarily defines this function as being an "inverse" function, it should be understood that the individual components and the values thereof may be so selected as to design any inherent processing function where the amount of delay obtained may be any desired inverse proportion to the frequency of the input signal. FIG. 7 depicts an exemplary pair of such oscilloscope patterns which allows a representative comparison to be made of the delay versus frequency characteristics obtained for approximately three-to-one change in frequency during the operation of the invention.

Obviously, many modifications and variations of the present invention are possible in the light of the above teachings. It is, therefore, to be understood that within the scope of the appended claims the invention may be practiced otherwise than as specifically described.

What is claimed is:

1. An autocorrelation system comprising in combination, a first mixer having a pair of inputs and an output with one of said inputs being responsive to an intelligence signal, an oscillator having an output connected to the other input of said pair of first mixer inputs, a high pass filter coupled to the output of said first mixer, a second mixer having a pair of inputs and an output with one of said inputs effectively coupled to the output of said high pass filter, a tuned amplifier connected to the output of said second mixer, and means interconnecting said one input of said first mixer which is responsive to said intelligence signal and the other input of the aforesaid second mixer for shifting the phase of said intelligence signal in accordance with a predetermined inverse function of the frequency thereof.

2. An autocorrelation system comprising in combination, a first mixer having a pair of inputs and an output with one of said inputs being responsive to an intelligence signal, an oscillator having an output connected to the other input of said pair of first mixer inputs, a high pass filter coupled to the output of said first mixer, a second mixer having a pair of inputs and an output with one of said inputs effectively coupled to the output of said high pass filter, a tuned amplifier connected to the output of said second mixer, and means connected between said one input of said first mixer and said other input of said second mixer for delaying said intelligence signal a period of time that is predeterminedly inversely proportional to the frequency thereof.

3. An autocorrelation system comprising in combination, a first mixer having a pair of inputs and an output with one of said inputs being responsive to an intelligence signal, an oscillator having an output connected to the other input of said pair of first mixer inputs, a high pass filter coupled to the output of said first mixer, a second mixer having a pair of inputs and an output with one of said inputs effectively coupled to the output of said high pass filter, a tuned amplifier connected to the output of said second mixer, and a dispersive delay line network connected between said one input of said first mixer and the other input of the aforesaid second mixer.

4. An autocorrelation system comprising in combination, a first mixer having a pair of inputs and an output with one of said inputs being responsive to an intelligence signal, an oscillator having an output connected to the other input of said pair of first mixer inputs, a high pass filter coupled to the output of said first mixer, a second mixer having a pair of inputs and an output with one of said inputs effectively coupled to the output of said high pass filter, a tuned amplifier connected to the output of said second mixer, a dispersive delay line network connected between said one input of said first mixer and the other input of the aforesaid second mixer comprising, a first parallel LC circuit having an input terminal and an output terminal, a second parallel LC circuit having an input terminal and an output terminal, a first series LC filter circuit interconnecting the input terminal of said first parallel LC circuit and the output terminal of said second parallel LC circuit, and a second series LC filter circuit connected between the input terminal of said second parallel LC circuit and the output terminal of said first parallel LC circuit.

5. In a sonar receiver, an autocorrelation system comprising in combination, a first mixer having a pair of inputs and an output with one of said inputs being responsive to an intelligence signal, an oscillator having an output connected to the other input of said pair of first mixer inputs, a high pass filter coupled to the output of said first mixer, a second mixer having a pair of inputs and an output with one of said inputs effectively coupled to the output of said high pass filter, a tuned amplifier connected to the output of said second mixer, and means interconnecting said one input of said first mixer which is responsive to said intelligence signal and the other input of the aforesaid second mixer for shifting the phase of said intelligence signal in accordance with a predetermined inverse function of the frequency thereof.

6. In an echo-ranging system, an autocorrelation system comprising in combination, a first mixer having a pair of inputs and an output with one of said inputs being responsive to an intelligence signal, an oscillator having an output connected to the other input of said pair of first mixer inputs, a high pass filter coupled to the output of said first mixer, a second mixer having a pair of inputs and an output with one of said inputs effectively coupled to the output of said high pass filter, a tuned amplifier connected to the output of said second mixer, and delaying means connected between said one input of said first mixer and said other input of said second mixer for delaying said intelligence signal a period of time that is predeterminedly inversely proportional to the frequencey thereof.

References Cited by the Examiner

UNITED STATES PATENTS

| | | |
|---|---|---|
| 2,753,448 | 7/1956 | Rines. |
| 2,982,924 | 5/1961 | Wegel et al. _____ 333—29 X |
| 3,064,235 | 11/1962 | Geren _____ 340—5 |

MALCOLM A. MORRISON, *Primary Examiner.*

K. CLAFFY, R. E. BERGER, A. J. SARLI,
*Assistant Examiners.*